United States Patent [19]

Lodi

[11] 4,017,713
[45] Apr. 12, 1977

[54] HEATER FOR SEVERING PLASTIC FILM

[75] Inventor: Frank Lodi, Niles, Ill.

[73] Assignee: Fast Heat Element Manufacturing Co., Inc., Elmhurst, Ill.

[22] Filed: Mar. 25, 1976

[21] Appl. No.: 670,449

Related U.S. Application Data

[63] Continuation-in-part of Ser. No. 500,565, Aug. 26, 1974, Pat. No. 3,947,656.

[52] U.S. Cl. .................................. 219/243; 53/33; 93/DIG. 1; 219/546; 338/243
[51] Int. Cl.² ................................................ H05B 1/00
[58] Field of Search ... 219/243, 245, 523, 530–538, 219/505, 544, 546; 338/226, 230, 238–240, 243, 241; 83/371, 16; 53/33, 373, DIG. 2; 93/DIG. 1; 156/515, 583

[56] References Cited

UNITED STATES PATENTS

| | | | |
|---|---|---|---|
| 3,005,402 | 10/1961 | Starger et al. | 219/243 X |
| 3,113,198 | 12/1963 | Shinn | 219/243 X |
| 3,916,148 | 10/1975 | LaFleur | 219/243 |

Primary Examiner—C. L. Albritton

[57] ABSTRACT

A temperature controlled electric heater for severing a web of vinyl film which includes a plastic coated metallic sheath having internal heater elements arranged in a ceramic core and a thermal resistance element nested in the core and in surface contact with the sheath for sensing the temperature of the heater; and means for securing the heater rigid and aligned with a web of vinyl film, said web being held under tension, and the heater being adapted to heat sever the film on contact with the web when the web is drawn over the heater.

10 Claims, 5 Drawing Figures

HEATER FOR SEVERING PLASTIC FILM

This application is a continuation-in-part of co-pending application Ser. No. 500,565, filed Aug. 26, 1974, now U.S. Pat. No. 3,947,565, for a Temperature Controlled Cartridge Heater.

The invention relates to improvements in cartridge type electric heaters and to means for holding the same relative to a web of vinyl film, and the invention is more particularly concerned with heaters for severing such vinyl films, such films being conventionally used in supermarket meat and produce wrapping operations. Severing such films requires a substantially constant controlled heat, usually at a temperature of about 275° F. when severing a poly vinyl chloride film of an average thickness of 7/10 mil., because the heater itself is used as the tool for cutting the film. If the heater is too cool (below about 270° F. in the foregoing example), the film will be frayed or torn and possibly not even severed, and if the heater is too hot (above about 290° F. in the foregoing example) the film is burned and produces smoke or toxic vapor.

Because the heater is intended for use in food wrapping operations, it is also important that the heater surface be constructed of materials which are easy to clean, but which will not interfere with the rapidity or quality of the cut, and to this end the heater embodying the present invention is coated with plastic material, such as Teflon, but the coating is applied so that the surface of the heater will remain roughened, rather than smooth, as to prevent the film from sticking to the surface of the sheath; and the plastic coating also prevents food particles and juices from baking onto the plastic coating as to interfere with the cutting operation and present a health hazard.

Also the invention includes means for securing the heater rigid and aligned with a web of vinyl film, and for holding the film under tension, so that when the web is drawn over the heater the film may be heat severed by merely contacting the heater.

In the present invention, the means for controlling the heater temperature within the critical limits comprises a thermistor or thermal resistor, which is a semiconductor having a large resistance change per degree of temperature change. The thermistor is placed in direct surface contact with the heater sheath as to be sensitive to the temperature at the severing point, with the variations of but a few degrees, to avoid the dangers of inadequately severing the film or burning the vinyl.

OBJECTS OF THE INVENTION

It is therefore an object of the invention to provide a heater and heater and web holding means for severing a web of vinyl film of the character referred to.

Another object is to provide a heater with a temperature controlling thermal resistance device for maintaining the temperature of the heater surface at a critical temperature suitable for severing a web of vinyl film drawn in contact with the heater surface without burning the film.

Another object is to provide a surface for a heater for severing plastic film which is easy to clean and maintain but will not interfere with the severing action of the heater when a web of plastic film is drawn in contact with the heater surface.

Another object is to provide a temperature controlled heater for severing plastic film which is devoid of moving parts.

Another object is to provide a heater of the character referred to and means for mounting the heater and tensioning a web of plastic film to be severed which is very efficient and accurate in use.

Other objects and advantages of the invention will become apparent with reference to the following description and the accompanying drawings.

DESCRIPTION OF A PREFERRED EMBODIMENT

Figure 1:
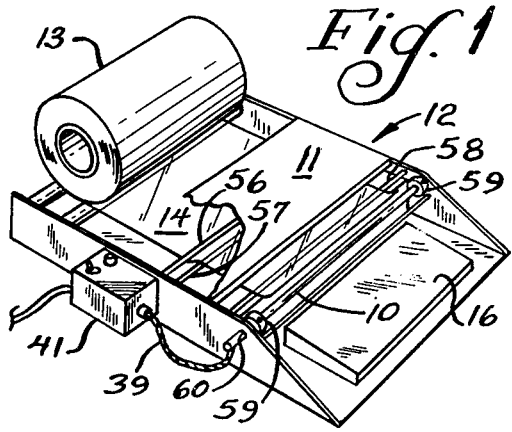
FIG. 1 is a perspective view showing a wrapping device having a heater assembly and holding and tensioning means embodying the invention.

Referring to the exemplary disclosure of the invention shown in the accompanying drawings and particularly to FIG. 1, the heater assembly 10 preferably is mounted horizontally on and slightly below a wrapping surface 11 of a supermarket packaging table 12. The table holds a supply of plastic film 13 having a web 14 extending therefrom and which is threaded under a first tensioning rod 56 and over a second tensioning rod 57, and over an elevating rod 58 for normally holding the web spaced apart from the heater 10. A flat area 16 may be provided on the wrapping surface 11 for holding a tray of meat or produce to be packaged in the film. After the package is wrapped with film, the film web trailing from the wrapped package is brought into contact with the heater assembly 10 which severs the web. The wrapped package may then be placed on a hot plate to seal the film edges.

The electric heater assembly 10 comprises a tubular sheath 21, preferably of heat conductive metal and of any required length. The heater is inserted into apertures 60 formed in the walls of the packaging table 12 in a horizontal plane between the rod 58 and the flat area 16, and collars 59 may be installed over the heater sheath 21, each positioned to bear against a wall of the packaging table, and secured by conventional means, such as set screws, to rigidly hold the heater in position on the table in alignment with the web 14. A control circuit housing 41 may be secured to the wrapping table 12 by conventional means, and the heater 10 may be electrically connected to the control circuit housing by means of electrical cable 39.

The tubular sheath 21 is closed at one end by an end disc 22 having a mica wafer 23 overlying the inside surface of said end disc. Arranged within the sheath through substantially its entire length is a ceramic core, preferably comprised of a plurality of like sections 24. These sections each have a set of four bores 25 extending axially therethrough, and the bores are in register with one another to provide continuous passages contiguous with the length of the core.

Two of the passages 25 each contain a heating element, such as the nickel-chrome resistance coils 26 shown. The coils have terminal posts 27 projecting out of one end of the core, to which are connected electric conductor wires 28. The remote ends of the coils 26 are connected together with a lead 29, usually formed by stretching the wire of the coils at the connecting point between them.

Figure 4:
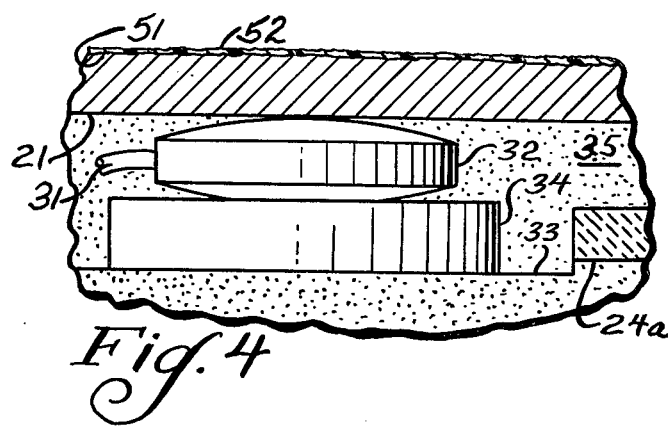
FIG. 4 is an enlarged fragmentary sectional view showing the heater sheath and temperature controlling sensor taken on line 4 — 4 of FIG. 3.
Figure 2:
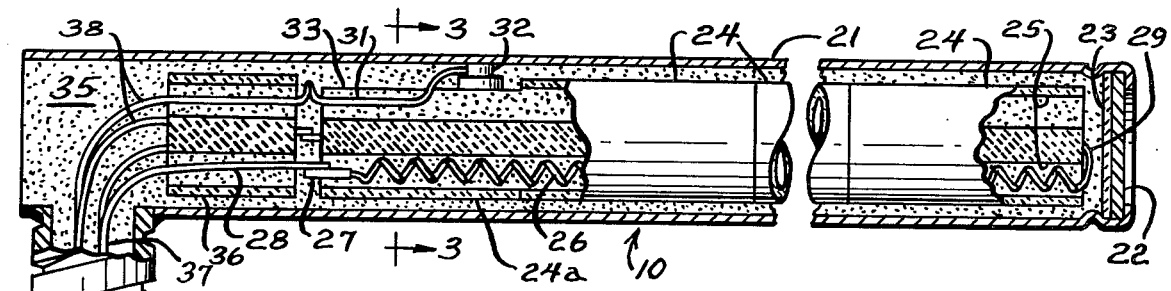
FIG. 2 is a longitudinal sectional view of the heater assembly showing the medial area broken away and the heater core in partial elevation.
Figure 3:
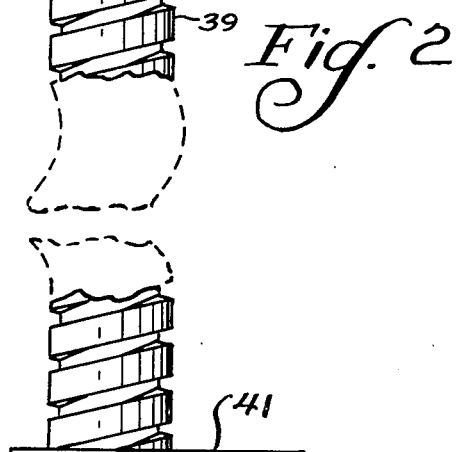
FIG. 3 is an enlarged sectional view of the heater assembly taken on line 3 — 3 of FIG. 2.
Figure 3:
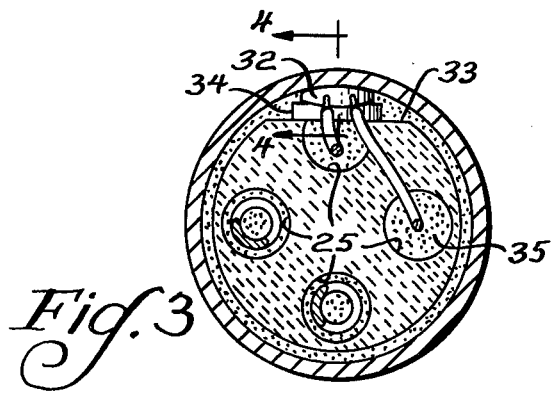

The remaining two passages or holes 25 in the core section 24a at the lead-in end of wires 28 leading to the heater coils 26 have lead-in wires 31, connected to a thermal resistance element 32 or thermistor. As best shown in FIGS. 3 and 4, the said core section 24a has a flat area 33 on its perimeter surface to accommodate the thermal resistance element 32. The thermistor comprises a pillow shaped disc or bead, which is preferably epoxy encapsulated and insulated to prevent unintended shorting of its leads against the sheath, and the thermistor may be seated on a resilient pad 34 of dielectric thermal insulating material arranged on the flat surface 33 of the core section 24a. The pad functions to head insulate the thermistor from the direct heat of the coils and to urge the thermistor into firm contact with the inside surface of the sheath 21. All voids in the sheath are filled with magnesium oxide powder 35.

Lead wires 28 and 31 are threaded through a ceramic cap 36, and thence out of the sheath, and are connected to respective lead wires 37 and 38 and within armored cable 39. The cable 39 is secured to the housing of a temperature controller 41.

Figure 5:
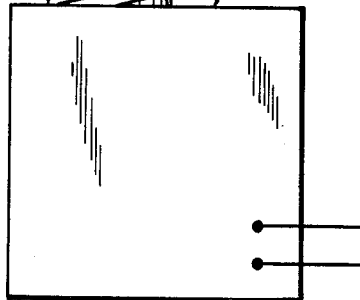
FIG. 5 is a schematic view of the electric circuit for the heater and control for maintaining the heater temperature constant.
Figure 5:
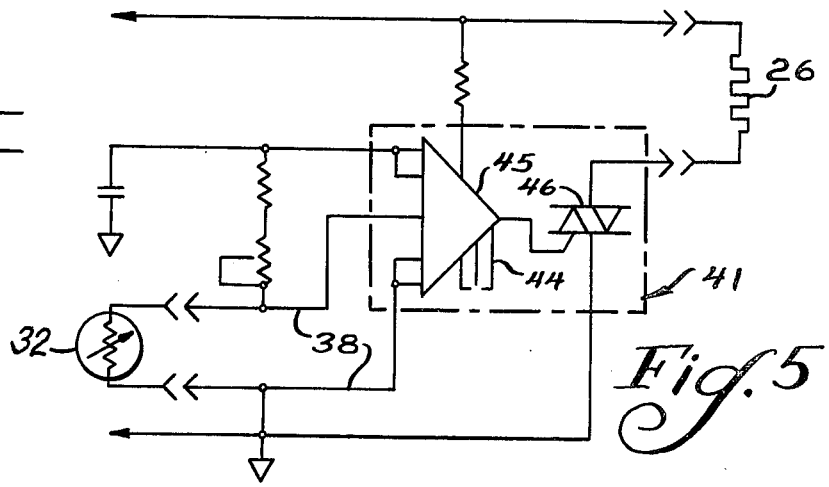

As best shown in the circuit diagram, FIG. 5, leads 38 leading from the thermistor 32 are connected in the temperature controller 41 to one leg of a bridge circuit 42 having a resistor 43 in another leg and an integrated circuit 44 across the output. This integrated circuit 44 may comprise a comparator-detector 45 with its own current supply, such as an RCA CA3079, triggering a conventional triac 46, such as a GE SC-136B. The heater coils 26 are connected to another leg of the integrated circuit 44 through its triac 46. When the thermistor 32 becomes hot, reflecting the temperature of the sheath 21, electrical resistance is decreased and that change in resistance is read by the comparator-detector 45, which generates a signal to trigger the triac into a non-conducting condition to shut off passage of current through heater coils 26. When the thermistor cools, electrical resistance is increased and that change in resistance is read by the comparator-detector 45, which generates a signal to trigger the triac 46 into conducting condition to allow passage of current through heater coils 26. The triac preferably is a zero voltage switch device capable only of being placed in conducting and non-conducting condition.

Thus, the alternate heating and cooling of the thermal resistor 32, which is extremely heat sensitive, will control on and off of the voltage applied to the heater coils, thus maintaining the sheath temperature at a pre-set level with the close temperature tolerances desired, so that as the temperature applied to the thermistor increases the electrical resistance descreases and as the temperature decreases the electrical resistance increases.

As shown in FIG. 4, the surface 51 of the exterior of the sheath 21 is roughened, as by sand blasting, and a coating 52 of Teflon is applied to the roughened surface. While some of the roughened surface 51 of the sheath may be transmitted to the exterior of the coating 52, in order to insure that the exterior surface of the coating is not smooth, the Teflon is applied by spraying a dry mixture of resin-Teflon particles onto the roughened surface 51, and the mixture is baked onto the surface in order to fully bond the particles together, and to the roughened surface of the sheath, leaving the coating with a irregular surface. The Teflon coating permits easy cleaning of the sheath surface exposed to the film and prevents baking on of food juices and pieces spilled on the heater; and the roughening of the coating prevents sticking of the film to the heater as to interfere with the speed and accuracy of the heat severing of the film.

For most efficient heat severing, the web of film should be held under tension as it is drawn in contact with the heater for severing, and the heater should be held by its ends and remain fixed in position relative to the film web, preferably in a horizontal plane.

While a triac 46 has been shown and described any positive switching device may be utilized for the switching function, such as an SCR or transistor. Inasmuch as the thermistor 32 shown in the circuit has a negative temperature coefficient, the integrated circuit 44 is of a type adaptable to respond to negative changes in resistance, but if a thermal resistor having a positive temperature coefficient were utilized the integrated circuit would be modified to detect, compare and switch upon positive changes in resistance.

Although I have described a preferred embodiment of the invention in considerable detail, the description is intended to be illustrative only rather than restrictive, as details of the structure may be modified or changed without departing from the spirit or scope of the invention. Accordingly, I do not desire to be restricted to the exact construction shown or described.

I claim:

1. An assembly for severing a longitudinally extending web of plastic film meltable at a given temperature and extending relative to a wrapping surface, said assembly consisting of tensioning means for holding said web extended to resist movement of said web responsive to light pressure pull exerted on one end of said web against said tensioning means, a heater assembly adapted to heat sever said web from edge to edge, heater securing means lying outside the severing plane extending from edge to edge of said web for holding said heater in longitudinal alignment with and transverse to the longitudinal axis of said web, said heater assembly comprising an elongated sheath carried by said securing means and adapted to contact said web from edge to edge, dielectric core means substantially coextensive and within said sheath means, a passageway in said dielectric core means, an electric heating element extending through said passageway and secured therein by said core means, a thermal resistance element within said sheath and arranged in surface contact with said sheath and between said sheath and said core means, a circuit connecting said electric heating element and said thermal resistance element with a source of current, and means in said circuit for controlling the flow of current through said circuit to said heating element responsive to said thermal resistance element to maintain said sheath at said given temperature for severing said film at its melting point when said web is brought into contact with said sheath.

2. The assembly recited in claim 1, wherein said sheath has release means for inhibiting binding of the web to said sheath during severing.

3. The assembly recited in claim 2, wherein said release means comprises a plastic coating on the sheath.

4. The assembly recited in claim 3, wherein said plastic coating is roughened.

5. The assembly recited in claim 1, wherein said heater securing means comprises means for holding the heater fixed relative to the normal plane extending from said web against movement in horizontal, vertical and lateral directions.

6. The assembly recited in claim 1, wherein said heater assembly and tensioning means are axially aligned and parallel to one another.

7. An electric heater assembly for severing a web of plastic film at a given temperature, comprising a metallic sheath, a plastic coating on said sheath and adaptable to contact said plastic web, a dielectric core means within and substantially coextensive with said sheath, a longitudinal passage within said core means, a heating element extending through and secured in said passage, a thermal resistance body arranged between said sheath and core means but insulated from said heating element and in surface contact with said sheath for sensing the temperature of said sheath, a circuit connecting said heating element and said thermal resistance body with a source of electric current, and means in said circuit responsive to the temperature sensed by said thermal resistance body for controlling the flow of current to the heating element to maintain said sheath at said given temperature.

8. The electric heater assembly recited in claim 7, wherein said coating is roughened.

9. The electric heater assembly recited in claim 8, wherein said coating comprises particles of Teflon and resin.

10. The electric heater assembly recited in claim 7, wherein said sheath is roughened.

* * * * *